United States Patent
Gueguen

(10) Patent No.: US 9,230,168 B2
(45) Date of Patent: Jan. 5, 2016

(54) AUTOMATIC GENERATION OF BUILT-UP LAYERS FROM HIGH RESOLUTION SATELLITE IMAGE DATA

(71) Applicant: DigitalGlobe, Inc., Longmont, CO (US)

(72) Inventor: Lionel Gueguen, Longmont, CO (US)

(73) Assignee: DIGITALGLOBE, INC., Westminster, CO (US)

( * ) Notice: Subject to any disclaimer, the term of this patent is extended or adjusted under 35 U.S.C. 154(b) by 146 days.

(21) Appl. No.: 13/955,268

(22) Filed: Jul. 31, 2013

(65) Prior Publication Data

US 2015/0036874 A1 Feb. 5, 2015

(51) Int. Cl.
  G06K 9/00 (2006.01)
  G06K 9/62 (2006.01)
(52) U.S. Cl.
  CPC .......... G06K 9/00637 (2013.01); G06K 9/6219 (2013.01)
(58) Field of Classification Search
  None
  See application file for complete search history.

(56) References Cited

U.S. PATENT DOCUMENTS

| | | | | |
|---|---|---|---|---|
| 6,035,057 | A * | 3/2000 | Hoffman | 382/159 |
| 6,496,208 | B1 * | 12/2002 | Bernhardt et al. | 715/853 |
| 2009/0123070 | A1 * | 5/2009 | Xiaoying | 382/176 |
| 2009/0226114 | A1 | 9/2009 | Choi et al. | |
| 2009/0303251 | A1 | 12/2009 | Balogh et al. | |
| 2010/0046842 | A1 * | 2/2010 | Conwell | 382/218 |
| 2011/0055290 | A1 | 3/2011 | Li et al. | |
| 2012/0027250 | A1 | 2/2012 | Omer et al. | |
| 2012/0219209 | A1 * | 8/2012 | Shotton et al. | 382/159 |
| 2013/0077819 | A1 | 3/2013 | Du et al. | |

OTHER PUBLICATIONS

M Pesaresi, GK Ouzounis, and L Gueguen, "A new compact representation of morphological profiles: report on first massive VHR image processing at the JRC", Proc. SPIE 8390, Algorithms and Technologies for Multispectral, Hyperspectral, and Ultraspectral Imagery XVIII, 839025 (May 8, 2012); doi:10.1117/12.920291.*
GK Ouzounis, M Pesaresi, and P Soille, "Differential Area Profiles: Decomposition Properties and Efficient Computation," IEEE Transactions on Pattern Analysis and Machine Intelligence, vol. 34, No. 8, pp. 1533-1548, published online Dec. 13, 2011.*

(Continued)

Primary Examiner — Matthew Bella
Assistant Examiner — Soo Shin
(74) Attorney, Agent, or Firm — Marsh Fischmann & Breyfogle LLP; Jonathon A. Szumny; Robert G. Crouch

(57) ABSTRACT

A system for automatically extracting interesting structures or areas (e.g., built-up structures such as buildings, tents, etc.) from HR/VHR satellite imagery data using corresponding LR satellite imagery data. The system breaks down HR/VHR input satellite images into a plurality of components (e.g., groups of pixels), organizes the components into a first hierarchical data structure (e.g., a Max-Tree), generates a second hierarchical data structure (e.g., a KD-Tree) from feature elements (e.g., spectral and shape characteristics) of the components, uses LR satellite imagery data to categorize components as being of interest or not, uses the feature elements of the categorized components to train the second data structure to be able to classify all components of the first data structure as being of interest or not, classifies the components of the first data structure with the trained second data structure, and then maps components classified as being of interest into a resultant image.

20 Claims, 9 Drawing Sheets

(56) References Cited

OTHER PUBLICATIONS

BP Salmon, "Improved Hyper-Temporal Feature Extraction Methods for Land Cover Change Detection in Satellite Time Series", PhD Thesis, University of Pretoria, Aug. 2012.*

R.F. Musy, R.H. Wynne, C.E. Blinn, J.A. Scrivani, R.E. McRoberts Automated forest area estimation via iterative guided spectral class rejection Photogrammetric Engineering & Remote Sensing, 72 (8) (2006), pp. 949-960.*

P Soille, "Constrained Connectivity for Hierarchical Image Partitioning and Simplification," IEEE Transactions on Pattern Analysis and Machine Intelligence, vol. 30, No. 7, Jul. 2008.*

BJ Devereux, GS Amable, and C Costa Posada, "An efficient image segmentation algorithm for landscape analysis," International Journal of Applied Earth Observation and Geoinformation 6 (2004) 47-61.*

Lionel Gueguen et al., "Tree Based Representations for Fast Information Mining From VHR Images," IPSC—Global Security and Crisis Management Unit, Joint Research Centre, European Commission, Oct. 2012.

Martino Pesaresi et al., "A Global Human Settlement Layer from Optical High Resolution Imagery, Concept and First Results," Joint Research Centre, European Commission, Institute for the Protection and Security of the Citizen, Dec. 2012.

Lionel Gueguen et al., Hierarchical Data Representation Structures for Interactive Image Information Mining, International Journal of Image and Data Fusion, Sep. 2012, vol. 3, Issue 3.

Martino Pesaresi et al., "A Global Human Settlement Layer from Optical HR/VHR RS data: concept and first results," IEEE Journal of Selected Topics in Applied Earth Observations and Remote Sensing, Aug. 15, 2013, vol. 6, No. 5.

\* cited by examiner

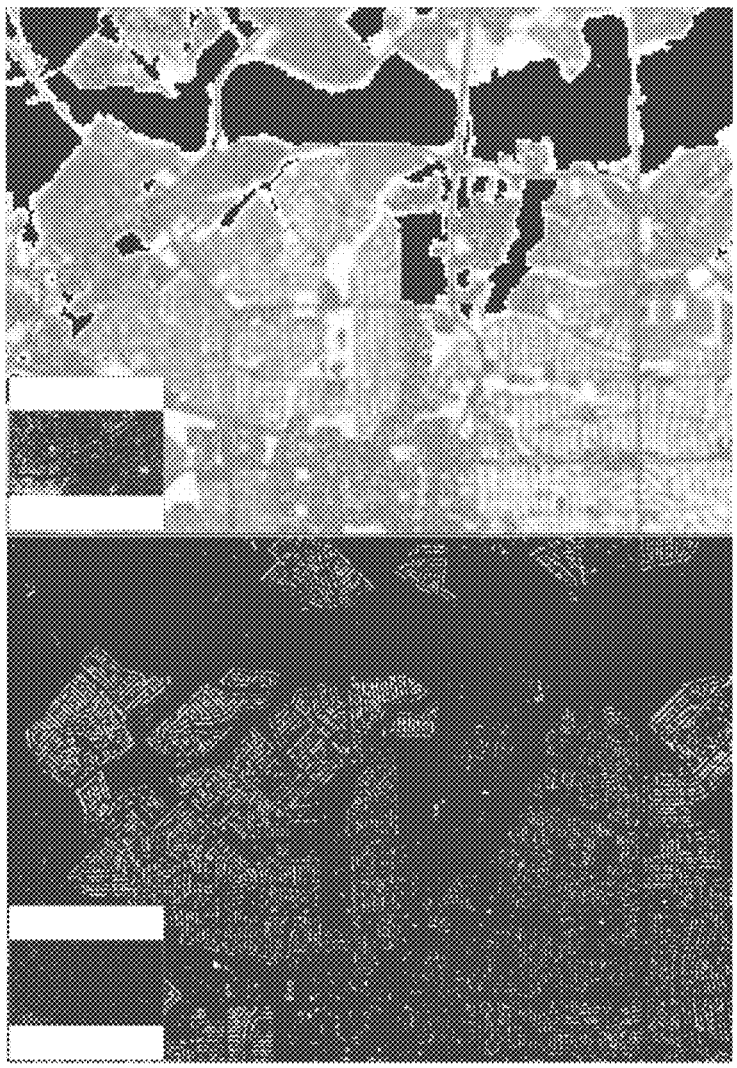

US 9,230,168 B2

AUTOMATIC GENERATION OF BUILT-UP LAYERS FROM HIGH RESOLUTION SATELLITE IMAGE DATA

BACKGROUND

Information on human settlements is crucial for a wide range of applications including emergency response, disaster risk reduction, population estimation/analysis, and urban/regional planning Urbanization pressure generates environmental impacts, indicates population growth, and relates to risk and disaster vulnerability. For instance, the global population passed the mark of 7.0 billion in 2011 with more than half of the population living in urban areas. Between 2011 and 2050, the urban population is expected to increase by about 2.7 billion, passing from 3.6 billion in 2011 to 6.3 billion in 2050. The population growth in urban areas is projected to be concentrated in the cities and towns of the less developed countries and continents. Asia, in particular, is projected to see its urban population increase by 1.4 billion, Africa by 0.9 billion, and Latin America and the Caribbean by 0.2 billion.

Population growth is therefore becoming largely an urban phenomenon concentrated in the developing world resulting in major challenges to manage the urban development in a sustainable manner. A central issue in this respect is the availability of up-to-date information on the extent and quality of the urban settlement (e.g., the urban "build-up" or "built-up") which is largely unavailable in developing countries. For instance, cities are often growing at a pace that cannot be fully controlled by the local or regional mapping agencies. As demographic pressure increases exponentially at a global level, the ability to monitor, quantify and characterize urbanization processes around the world is becoming paramount. The information about the quality of urban development can provide precious input for understanding the vulnerability of the population living on our planet.

While satellite imagery could provide information about the world-wide built-up environment, there are few global data sets available that could be used to map the human settlements. Examples include the night-time lights of the world based on the Defense Meteorological Satellite Program-Operational Linescan System (DMSP-OLS) sensor, Moderate Resolution Imaging Spectroradiometer (MODIS) based land use/land cover classifications, and global population data sets like LandScan™ or the gridded population of the world (GPW). While the aforementioned data sets are useful for global analysis, the data sets have the tendency to under-represent small, scattered rural settlements due to the low spatial resolution of the data sets between, for instance, 500 and 2,000 m. Furthermore, the data sets represent single snap-shots in time that do not allow for regular monitoring. Still further, if the data sets are updated (e.g., the LandScan data set), they are not directly comparable due to changing input sources.

SUMMARY

Although high resolution (HR, 1-10 m spatial resolution) and even very high resolution (VHR, ≤1 m) data with an almost global coverage is or will be available with different sensors (e.g., System for Earth Observation (SPOT), China-Brazil Earth Resources Satellite program (CBERS), RapidEye, IKONOS® 2, QuickBird, WorldView-1, WorldView-2, WorldView-3), no consistent global coverage of built-up settlements derived from these datasets exists. Mapping and monitoring of urban areas at HR and VHR scales is mostly limited in terms of temporal and spatial coverage. The lack of a consistent global layer with HR/VHR spatial resolution can be attributed to a number of reasons. In one regard, global coverage is costly due to, for instance, the fact that most HR/VHR satellite missions are operated on a commercial basis. In another regard, no systems have yet been able to demonstrate the capacity to automatically extract global information layers about human settlement (built-up structures such as cities, refugee camps, etc.) from HR/VHR satellite data with relatively low levels of time, effort (e.g., low number of processor clock cycles), and other computational costs.

It has thus been determined that globally and regionally consistent information from HR and VHR input image data (e.g., multispectral, panchromatic, etc.) is needed that can be obtained inside time constraints and data constraints (e.g., in relation to resolution, volume, quality, etc.) typical of crisis management scenarios. Broadly, disclosed herein are utilities (e.g., systems, processes, etc.) for automatically extracting or isolating structures or areas of interest (e.g., built-up structures such as buildings, houses, shelters, tents, etc.) from HR/VHR satellite imagery data using corresponding LR satellite imagery data. More particularly, the disclosed utilities employ a first hierarchical data structure (e.g., a "Max-Tree") for organizing HR/VHR input images (e.g., of a particular geographic area) into a plurality of meaningful, hierarchically arranged, connected components in addition to determining one or more features or feature elements of each of the components (e.g., contrast, area, compactness, linearity, average spectral response, eccentricity or inertia of the component). The disclosed utilities also employ use of a second hierarchical data structure (e.g., a "KD-Tree") for managing organization of the plurality of feature elements (i.e., of the "feature-space" of the input image). Generally, the second hierarchical data structure offers a structured representation of the feature-space from which a classification (e.g. built-up or non built-up) of the components of the first hierarchical data structure can be directly determined. For instance, those components classified as built-up may be projected or otherwise mapped into a spatial domain of a resultant image having a high resolution (e.g., HR, VHR) with relatively low levels of computational effort.

As opposed to the classical paradigm of interactive learning followed by a time consuming model application on the spatial domain, the disclosed utilities shift the operational complexity to the feature space structuring. As a result, interactive classification of massive image data can be launched in near real-time. For instance, an experiment utilizing the disclosed utilities on an eight-band multi-spectral image (each band obtaining an image that is 10070×58734 pixels) may be concluded in 577 seconds using a 2.4 GHz Intel® Core™ CPU and 8 GB RAM (thus representing 14,400 km$^2$/h/CPU). An interactive query of the information content may then be conducted on the classification results. When the hierarchical image and feature space data representation structures (i.e., the first and second hierarchical data structures) are stored in memory (e.g., volatile memory, such as RAM), scene classification (subject to different criteria) can be re-iterated rapidly to offer dynamic views of what may be massive image information content.

In one aspect, a method of extracting built-up structures (e.g., and/or other structures of interest) from satellite imagery data includes decomposing, using a processor, at least one input satellite image into a plurality of components (e.g., pixels or groups of pixels) of a first hierarchical data structure (e.g., a space-partitioning data structure for organizing data points, such as a Max-Tree). The input image is associated with a geographic area (e.g., town, city, region, etc.) and has a first resolution (e.g., HR, such as 1-10 m spatial resolution; VHR, such as less than 1 m spatial resolution; etc.). Each of the components is characterized by at least one feature element (e.g., a k-dimensional shape and/or spectral descriptor such as contrast, area, compactness, linearity, average spectral response, standard deviation of spectral response, eccentricity or inertia of the component).

This method also includes constructing, using the processor, a second hierarchical data structure (e.g., another space-partitioning data structure for organizing data points, such as a KD-Tree) that includes a plurality of hierarchically-arranged nodes, where each of the feature elements depends from at least one of the nodes; and deriving or otherwise obtaining training components (e.g., training examples, such as 1000 components, 2000 components, etc.) from the plurality of components of the first hierarchical data structure that indicate built-up (e.g., and/or other structures of interest) and non-built-up structures (e.g., or other areas/land not of interest) in the input image using a first reference image data set (e.g., Landscan population density reference layer, MODIS-500 m Global Urban Extent (GUE) information layer, National Land Cover Database (NLCD) 2006, Corine Land Cover 2006, etc.) that is associated with the geographic area and has a second resolution lower than the first resolution. The first reference image data set may be one or more relatively low-resolution satellite imagery data sets (e.g., maps, layers) of any appropriate resolution (e.g., greater than 10 m spatial resolution, such as greater than 30 m spatial resolution, or even greater than 100 m spatial resolution) for which relatively consistent global coverage is available. For instance, one of the training components may identify a built-up structure or area when the training component falls within a built-up area as indicated by the first reference data set (e.g., when the training component includes pixels that fall within an area of increased population and/or built-up structures in the first reference data set).

In one arrangement, the method may include training, with the processor, the second hierarchical data structure with the feature elements of the training components for detecting built-up structures. As an example, various feature elements in the second hierarchical data structure that are similar and/or substantially the same as feature elements of the training components may be identified. Thereafter, the various nodes of the second hierarchical data structure that are disposed on the same leaf-path (e.g., branch(es)) as the identified feature elements may be appropriately labeled (e.g., flagged, marked, etc.) as being in the same class (e.g., built-up or non-built-up) as the corresponding feature elements of the training components. For instance, each node of the second hierarchical data structure may include a "positive" (e.g., identifying built-up or other structure(s) of interest) class counter and/or a "negative" (e.g., identifying non-built-up or structure(s) not of interest) class counter. In this regard, the positive and/or negative counters of each node may be appropriately updated (e.g., incremented upwardly or downwardly) during the training process. In the event that subsets of feature elements in the second hierarchical data structure are clustered or grouped (e.g., are close enough with respect to some dissimilarity), any updates to class counters of the nodes along the same leaf-path as one of the feature elements may, in one embodiment, be automatically propagated to the class counters of the nodes along the same leaf-paths as one or more of the other feature elements in the clusters.

Thereafter, the method may include classifying, with the processor and using the trained second hierarchical data structure, the plurality of components of the first hierarchical data structure as identifying built-up structures or non-built-up structures. Stated differently, the method may include extracting, by the processor, those components in the first hierarchical data structure that depict built-up structures as identified by the trained second hierarchical data structure. As an example, the processor may systematically analyze and/or compare the collective set of feature elements for each component of the first hierarchical data structure in relation to the feature elements of the trained second hierarchical data structure to determine whether the component identifies a built-up structure or a non-built-up structure. For instance, a component (e.g., pixel or group of pixels) in the first hierarchical data structure may be labeled, tagged or classified as "built-up" when one or more (e.g., a majority, most, all, etc.) of its feature elements match or are similar to feature elements of the trained second hierarchical data structure associated with built-up structures (e.g., have a value within some percentage of the value of a feature element from the trained second hierarchical data structure).

In one arrangement, the method may include mapping or projecting components of the plurality of components that identify built-up structures as classified during the classifying step into a resultant image that is associated with the geographic area and that has a third resolution greater than the second resolution. For instance, the resultant image may be presented on any appropriate display (e.g., of a laptop, tablet, smartphone, etc.) and may be similar or even substantially the same as (e.g., in relation to spatial resolution, depicted geographic area, etc.) the input image but free of non-built-up structures (e.g., or free of areas that are not of interest). Advantageously, crisis management teams may be able to quickly and accurately assess possible high population areas to determine appropriate response strategies.

Various measures may be taken to improve the accuracy of the aforementioned built-up detection and extraction process. In one arrangement, the method may continue to perform the deriving, training and classifying steps with respect to additional portions of the plurality of components to further refine the accuracy of the detected and extracted built-up structures that are mapped into the resultant image. For instance, the method may include deriving additional training components (e.g., at least partially or fully non-overlapping with the previous set of training components, such as from a different portion of the input satellite image(s)) from the plurality of components of the first hierarchical data structure that indicate built-up and non-built-up structures in the input image using the first reference image data set; training, with the processor, the second hierarchical data structure with the feature elements of the additional training components for detecting built-up structures; and classifying, with the processor and using the second hierarchical data structure as trained with the additional training components, the plurality of components of the first hierarchical data structure as identifying built-up structures or not identifying built-up structures.

In another arrangement, the method may include ascertaining error rates (e.g., equal error rates (EER), etc.) between components that identify built-up structures from the classifying step and corresponding portions of a second reference data set (e.g., a low spatial resolution data set the same as or different than the first reference image data set, and that is assumed to have consistent, non-obscured global coverage) that identify built-up structures; and mapping components that identify built-up structures that are associated with error rates below a threshold error rate into a resultant image that is associated with the geographic areas and that has a third resolution that is greater than the second resolution. In one variation, built-up structure components may be extracted from successive input images of the geographic area (e.g., obtained via heterogeneous sources, different satellites, different locations, different times such as multitemporal images, different frequencies or wavelengths such as multispectral images, etc.) and mapped into the resultant image to allow for an iterative refinement of the resultant image over a plurality of cycles.

For instance, particular components of a first input image that have been classified as identifying built-up structures may be associated with error rates over a particular threshold when compared against corresponding portions of the second reference image data set (e.g., such as due to cloud cover or the like when the first input image was obtained). In this regard, the particular components of the first input image may be not mapped into the resultant image or at least mapped into the resultant image to a lesser degree (e.g., assigned a lower weight based how far over the threshold were the corresponding error rates). However, particular components of a second input image that have been classified as identifying built-up structures and over the same geographic vicinity as the particular components of the first input image may be associated with error rates below a particular threshold when compared against corresponding portions of the second reference image data set (e.g., such as due to the image being obtained from a high azimuth and during a partially or fully cloudless, sunny day).

In this regard, the particular components of the second input image may be mapped into the resultant image or even mapped into the resultant image to a greater degree (e.g., assigned a higher weight based how far under the threshold were the corresponding error rates). Advantageously, those built-up structure components that have been obscured for one reason or another from each successive input image (e.g., as determined by the ascertained error rates) may be at least partially excluded from the resultant image to allow the method to converge on extensive, high resolution coverage of built-up structures in the geographic area (e.g., where the resultant image includes at least some components of each of the successive input images). Stated differently, only those pixels of each of the successive images that are determined to be the "best" (e.g., as determined by the ascertained error rates) may be included in the resultant image.

In another aspect disclosed herein, a system for extracting structures of interest from optical images includes a construction engine, executable by a processor, that decomposes an input image associated with a geographic area and having a first resolution into a plurality of components, generates a first hierarchical data structure from the plurality of components that includes a plurality of k-dimensional feature elements of each of the components, and constructs a second hierarchical data structure that include a plurality of hierarchically-arranged nodes, where each of the plurality of k-dimensional feature elements depends from at least one of the nodes. The disclosed system also includes a training engine that uses feature elements of a first portion of the plurality of components of the first hierarchical data structure to train the second hierarchical data structure to detect components of the plurality of components in the first hierarchical data structure that correspond to structures of interest in the input image.

In one arrangement, the system includes a classification engine, executable by the processor, that uses the trained second hierarchical data structure to extract a second portion of the plurality of components of the first hierarchical data structure that corresponds to the structures of interest in the input image. For instance, the system may also include a mapping engine that maps the second portion into a resultant image that is associated with the geographic area and that has a third resolution that is greater than the second resolution.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 4b is a KD-Tree built from the partitioning procedure illustrated in FIG. 4a.

FIG. 7a is a close-up of a resultant image including built-up extracted from the multispectral images of FIG. 6 using the information layer of FIG. 6, where the close-up is at a first level of zoom.

FIG. 7b is a close-up of the information layer of FIG. 6 corresponding to the resultant image close-up of FIG. 7a.

FIG. 8a is a resultant image close-up similar to the close-up of FIG. 7a, but at a closer, second level of zoom.

FIG. 8b is a close-up of the multispectral images of FIG. 6 corresponding to the resultant image close-up of FIG. 8a.

DETAILED DESCRIPTION

Figure 1:
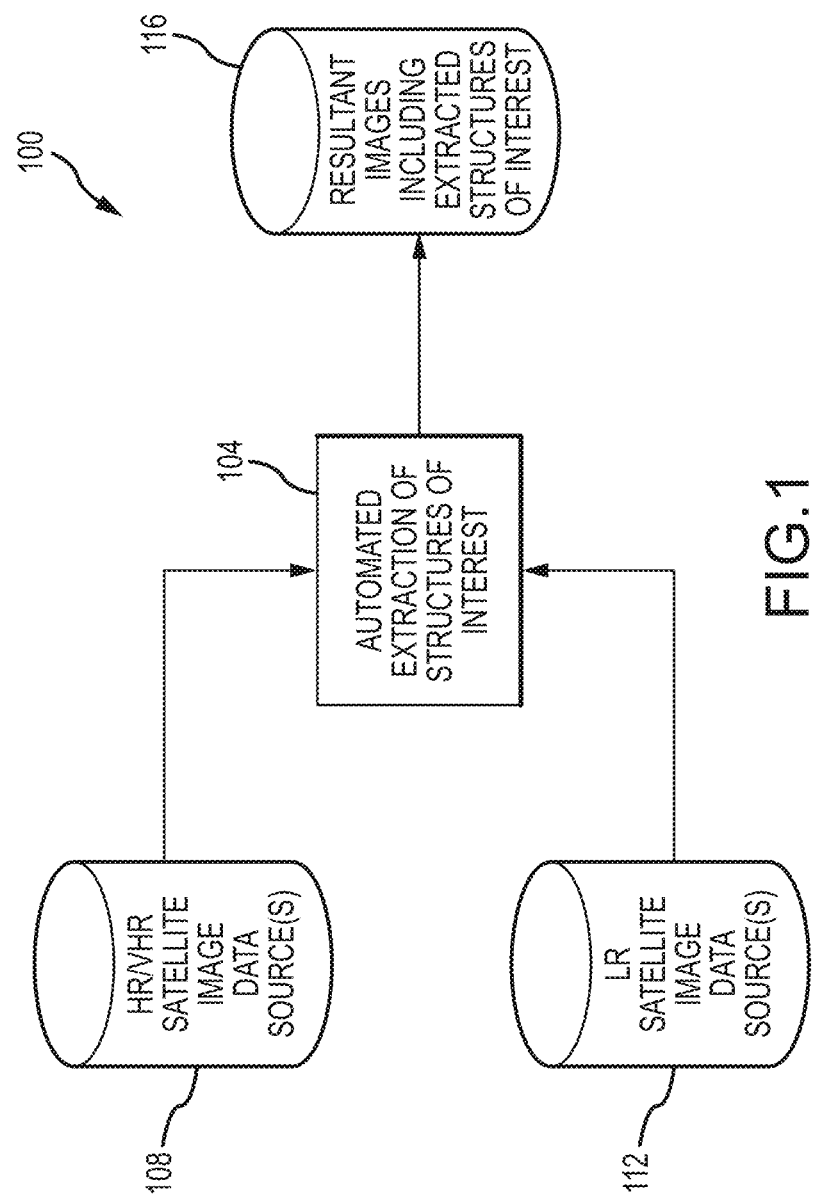
FIG. 1 is a simplified block diagram illustrating a process of extracting structures of interest from satellite imagery data.

Disclosed herein are utilities (e.g., systems, processes, etc.) for automatically extracting or isolating structures or areas of interest (e.g., built-up structures such as buildings, houses, shelters, tents; agricultural areas; etc.) from HR/VHR satellite imagery data using corresponding LR satellite imagery data. The disclosed utilities employ a unique use of first and second hierarchical data structures (e.g., space-partitioning data structures for organizing data points, such as Max and KD-Trees) to break down HR and/or VHR input satellite images into a plurality of hierarchically arranged connected portions or components (e.g., groups of pixels), organize corresponding feature elements (e.g., spectral and shape characteristics) of each of the components into a manageable structure, train the manageable structure of feature elements to recognize structures of interest in the components, classify the various components of the input image with the trained feature elements, extract components classified as structures of interest from the input image, and map the extracted components into a resultant image that includes the various structures of interest. The disclosed utilities can be executed at high rates of speed and with reduced use of computational resources. The resultant images can be used in numerous contexts such as in assessing population densities, qualities of life, vulnerability factors, disaster risks, sufficiency of civil infrastructures, economic growth, poverty levels, event monitoring and evolution, and the like.

At the outset, it is noted that, when referring to the earth herein, reference is made to any celestial body of which it may be desirable to acquire images or other remote sensing information. Furthermore, when referring to a satellite herein, reference is made to any spacecraft, satellite, and/or aircraft capable of acquiring images or other remote sensing information. Furthermore, the utilities described herein may also be applied to other imaging systems, including imaging systems located on the earth or in space that acquire images of other celestial bodies. It is also noted that the drawing figures contained herein are not necessarily drawn to scale and that such figures have been provided for the purposes of discussion and illustration only.

Generally, high resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like. In the case of a consumer digital camera, as one non-limiting example, an image sensor is generally arranged in an area array (e.g., 3,000 rows of 3,000 pixels each, or 9,000,000 total pixels) which collects the image area in a single "snapshot." In the case of satellite-based imaging, as another non-limiting example, the "push-broom scanning" principle is sometimes employed whereby each image sensor includes a relatively small number of rows of a great number of pixels (e.g., 50,000 or more) in each row. Each row of pixels may be scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of satellite images varies depending on factors such as the particular instrumentation utilized, the altitude of the satellite's orbit, and the like.

Image collection platforms (e.g., aircraft, earth-orbiting satellites, etc.) may collect or acquire various types of imagery in one or more manners. As one non-limiting example, image collection platforms may perform panchromatic collection of scenes of a celestial body which generally refers to the collection of image data across a single broad range of wavelengths (e.g., all visible light, from near infrared (NIR) to near ultraviolet (NUV), etc.). As another non-limiting example, image collection platforms may additionally or alternatively capture image data within the visible light band and include respective filters to separate the incoming light into red, green and blue portions. As a further non-limiting example, image collections platforms may additionally or alternatively perform multispectral collection of scenes of a celestial body which generally refers to the collection of image data at multiple specific spectral bands across the electromagnetic spectrum (e.g., within bands both inside and outside of the visible light range such as NIR, short wave infrared (SWIR), far infrared (FIR), etc.). For instance, a satellite may have one image sensor that is sensitive to electromagnetic radiation across only a first spectral band (e.g., the visible light band, such as a wavelength range of about 380-750 nm) in addition to one or more additional image sensors that are sensitive to electromagnetic radiation only across other spectral bands (e.g., NIR, 750-1400 nm; SWIR, 1400-3000 nm; etc.). Multi-spectral imaging may allow for the extraction of additional information from the radiance received at a satellite after being reflected from the Earth's surface (which may include atmospheric effects such as from aerosols, clouds, etc.).

As discussed previously, there are generally few global data sets available that could be used to map the human settlements, much less high resolution satellite image data sets (e.g., HR, VHR) that could be used to do so. For instance, current global data sets (e.g., MODIS 500 m, Landscan, NLCD 2006, Corine Land Cover 2006, etc.) have the tendency to under-represent small, scattered rural settlements due to their low spatial resolution (e.g., between 50 and 2,000 m). Furthermore, the data sets represent single snap-shots in time that do not allow for regular monitoring. Still further, if the data sets are updated, they are typically not directly comparable due to changing input sources.

In this regard, FIG. 1 presents a simplified block diagram of a system 100 that may be used to generate and map regionally and globally consistent structures of interest such as human settlements (e.g., including built-up structures) within the time constraints and data constraints (e.g., in relation to resolution, volume, quality, etc.) typical of crisis management scenarios and the like. At the heart of the system 100 may be the automated extraction 104 of structures of interest from HR/VHR satellite image data source(s) 108 (e.g., <1-10 m spatial resolution satellite image data obtained by a number of heterogeneous platforms such as SPOT 2 and 5, CBERS 2B, RapidEye 2 and 4, IKONOS® 2, QuickBird 2, WorldView 1 and 2) and generation of resultant images 116 that include the extracted structures of interest therein. The automated extraction 104 may use data from LR satellite image data source(s) 112 (e.g., >10 m spatial resolution, such as MODIS 500 m, Landscan, etc.) for use in obtaining samples of the HR/VHR satellite image data 108 that will be used to train a hierarchical data structure for classifying and thus extracting structures of interest from the HR/VHR satellite image data 108.

Figure 2:
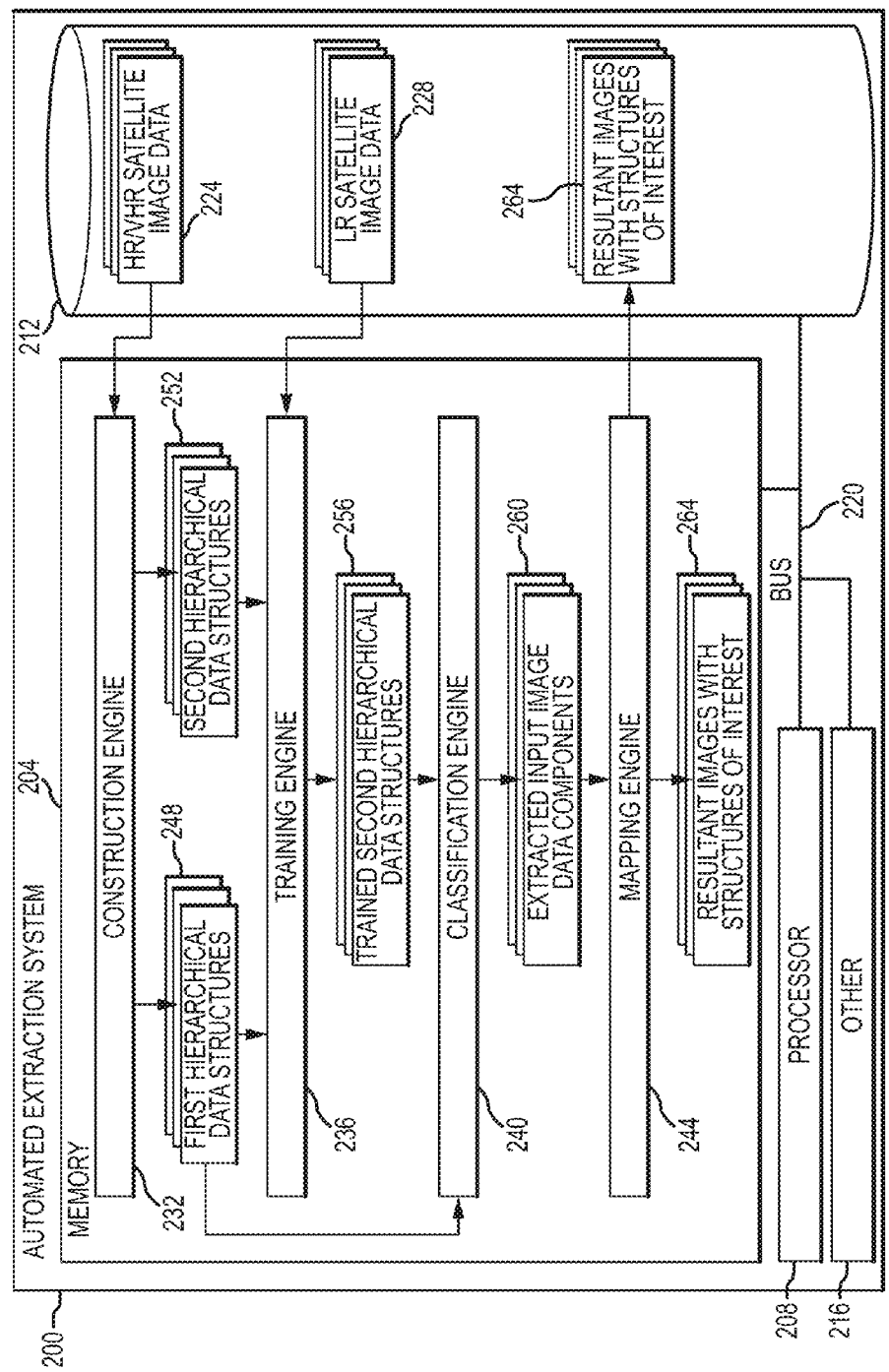
FIG. 2 is a more detailed block diagram of an automated extraction system for obtaining structures of interest from satellite imagery data.

Turning now to FIG. 2, a more detailed block diagram of an automated extraction system 200 that may be used to implement the automated extraction 104 of structures of interest shown in FIG. 1 is presented. Although depicted as a single device (e.g., server, workstation, laptop, desktop, mobile device, and/or other computing device), one or more functionalities, processes or modules of the system 200 may be allocated or divided among a plurality of machines, devices and/or processes which may or may not be embodied in a single housing. In one arrangement, functionalities of the system 200 may be embodied in any appropriate cloud or distributed computing environment.

Broadly, the system 200 may include memory 204 (e.g., one or more RAM or other volatile memory modules, etc.), a processing engine or unit 208 (e.g., one or more CPUs, processors, processor cores, or other similar pieces of hardware) for executing computer readable instructions from the memory 204, storage 212 (e.g., one or more magnetic disks or other non-volatile memory modules or non-transitory computer-readable mediums), and/or a number of other components 216 (e.g., input devices such as a keyboard and mouse, output devices such as a display and speakers, and the like), all of which may be appropriately interconnected by one or more buses 220. While not shown, the system 200 may include any appropriate number and arrangement of interfaces that facilitate interconnection between the one or more buses 220 and the various components of the system 200 as well as with other devices (e.g., network interfaces to allow for communication between the system 200 and other devices over one or more networks, such as LANs, WANs, the Internet, etc.).

The system 200 may retrieve any appropriate HR/VHR satellite image data 224 (e.g., from one or more HR/VHR satellite image data sources 108 of FIG. 1) as well as any appropriate LR satellite image data 228 (e.g., from one or more LR satellite image data sources 112 of FIG. 1) and store the same in any appropriate form in storage 212 (e.g., such as in one or more databases and manageable by any appropriate database management system (DBMS) to allow the definition, creation, querying, update, and administration of the databases). The processing engine 208 may execute a DBMS or the like to retrieve and load the HR/VHR satellite image data 224 and/or LR satellite image data 228 into the memory 204 for manipulation by a number of engines or modules of the system 200 as will be discussed in more detail below.

As shown, the system 200 may include a "construction" engine 232 that is broadly configured to construct first and second hierarchical data structures from input satellite images, a "training" engine 236 that is broadly configured to train the second hierarchical data structure to detect the components of structures of interest in the first hierarchical data structure, a "classification" engine 240 that is broadly configured to employ the trained second hierarchical data structure to detect structures of interest in the first hierarchical data structure, and a "mapping" engine 244 that is broadly configured to transfer the components classified as being of interest into a resultant image. Each of the engines (and/or other engines, modules, logic, etc. disclosed and/or encompassed herein) may be in the form of one or more sets of computer-readable instructions for execution by the processing unit 208 and that may be manipulated by users in any appropriate manner to perform automated extraction and presentation of structures of interest (e.g., built-up layers or the like) on a display (not shown). In this regard, the combination of the processor 208, memory 204, and/or storage 212 (i.e., machine/hardware components) on the one hand and the various engines/modules disclosed herein in one embodiment create a new machine that becomes a special purpose computer once it is programmed to perform particular functions of the extraction utilities disclosed herein (e.g., pursuant to instructions from program software).

In one arrangement, any appropriate portal in communication with the various engines may run on the system 200 and be accessible by users (e.g., via any appropriate browser) to access the functionalities of the system 200. While the various engines have been depicted in FIG. 2 as being separate or distinct modules, it is to be understood that the functionalities or instructions of two or more of the engines may actually be integrated as part of the same computer-readable instruction set and that the engines have been depicted in the manner shown in FIG. 2 merely to highlight various functionalities of the system 200. Furthermore, while the engines have been illustrated as being resident within the (e.g., volatile) memory 204 (e.g., for execution by the processing engine 208), it is to be understood that the engines may be stored in (e.g., non-volatile) storage 212 (and/or other non-volatile storage in communication with the system 200) and loaded into the memory 204 as appropriate.

Figure 3:
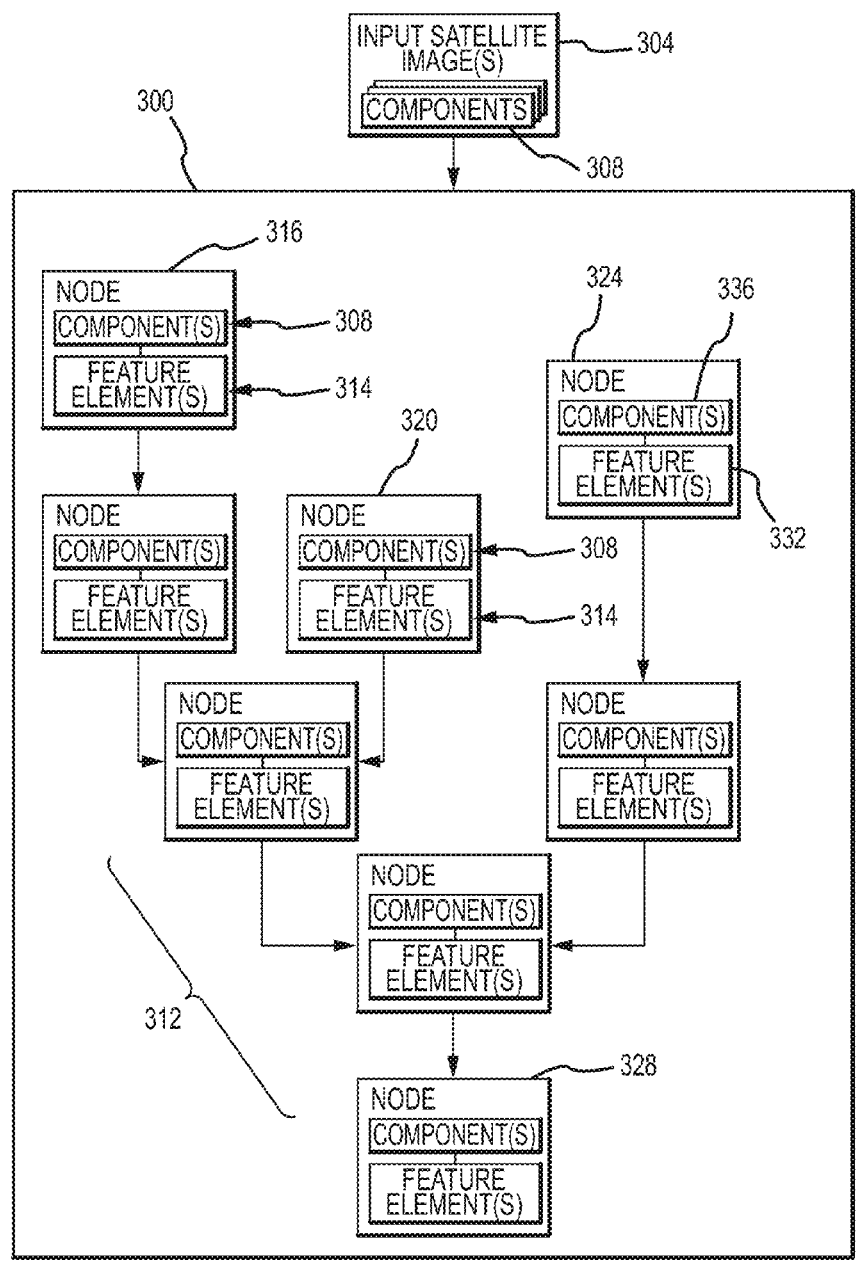
FIG. 3 is a block diagram of a Max-Tree for hierarchically arranging components of an input satellite image.
Figure 4A:
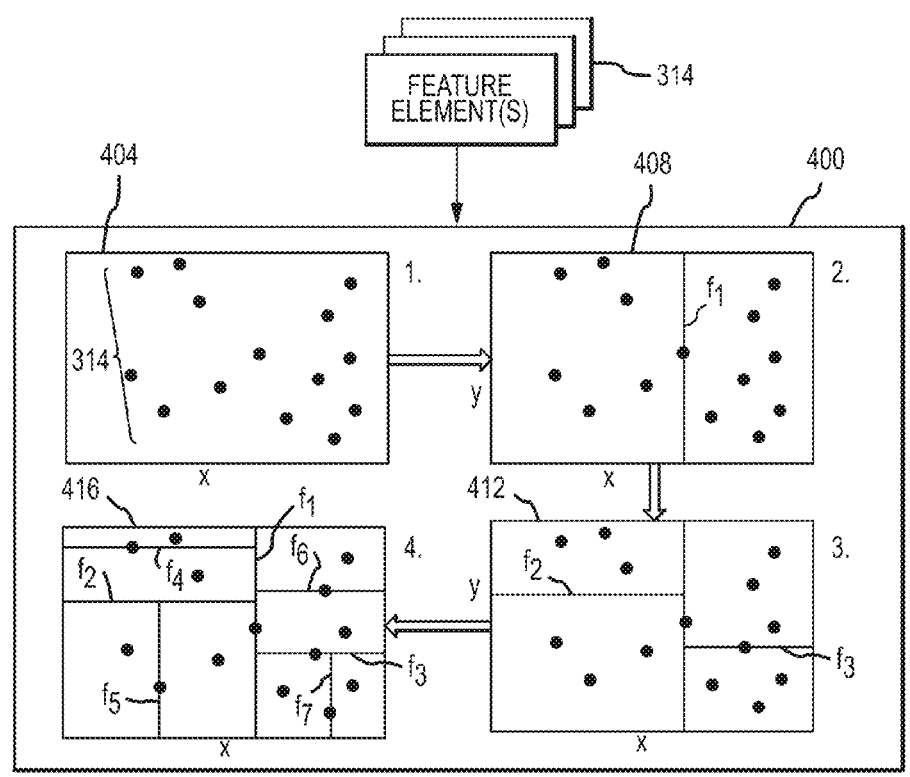
FIG. 4a is a schematic diagram of a KD-Tree based space partitioning procedure for use in hierarchically arranging feature elements of the components of FIG. 3.
Figure 4B:
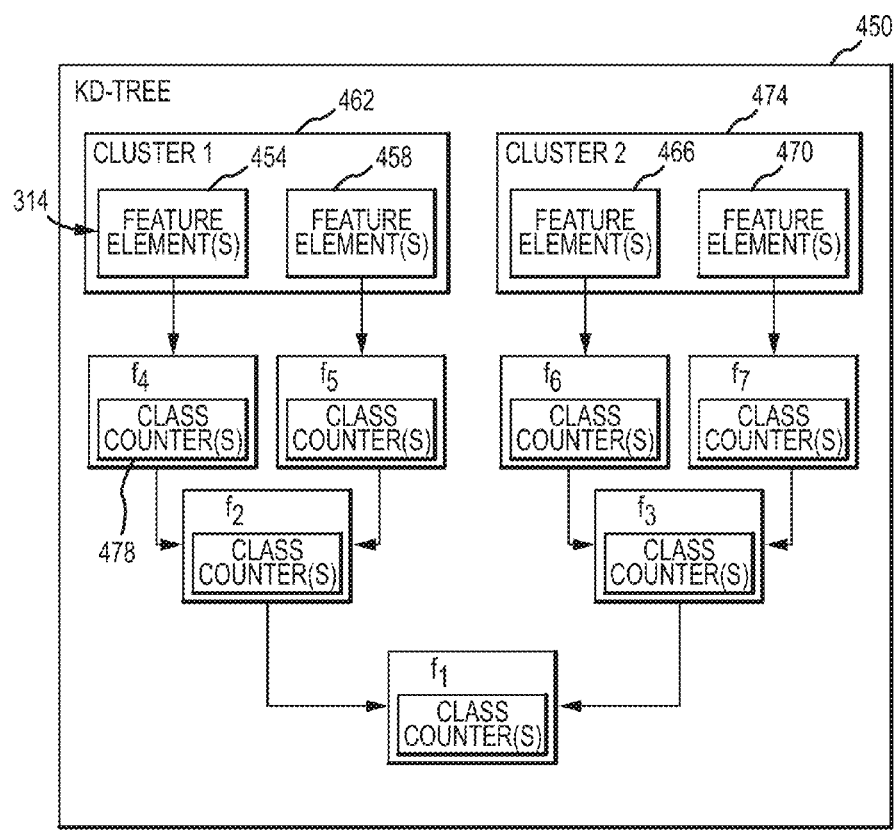
Figure 5:
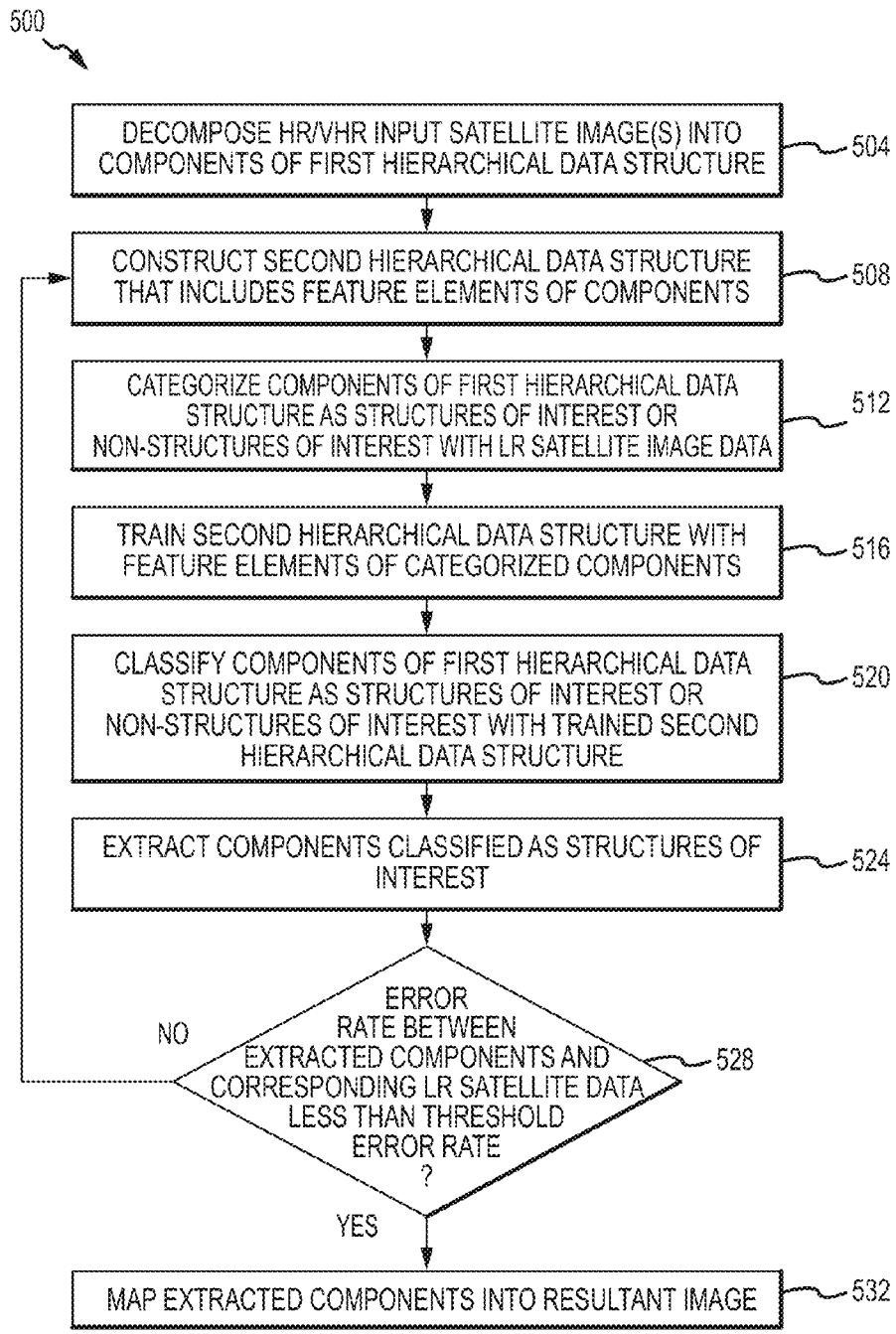
FIG. 5 is a flow diagram of a method for extracting structures of interest from satellite imagery data.

To facilitate the reader's understanding of the various engines of the system 200, additional reference is now made to FIG. 5 which illustrates a method 500 for use in performing the automated extraction processes disclosed herein as well as to FIGS. 3, 4a and 4b which respectively illustrate a Max-Tree and a KD-Tree for use in organizing data as part of the method 500 of FIG. 5. While specific steps (and orders of steps) of the method 500 have been illustrated and will be discussed, other methods (including more, fewer or different steps than those illustrated) consistent with the teachings presented herein are also envisioned and encompassed within the present disclosure.

Figure 6:
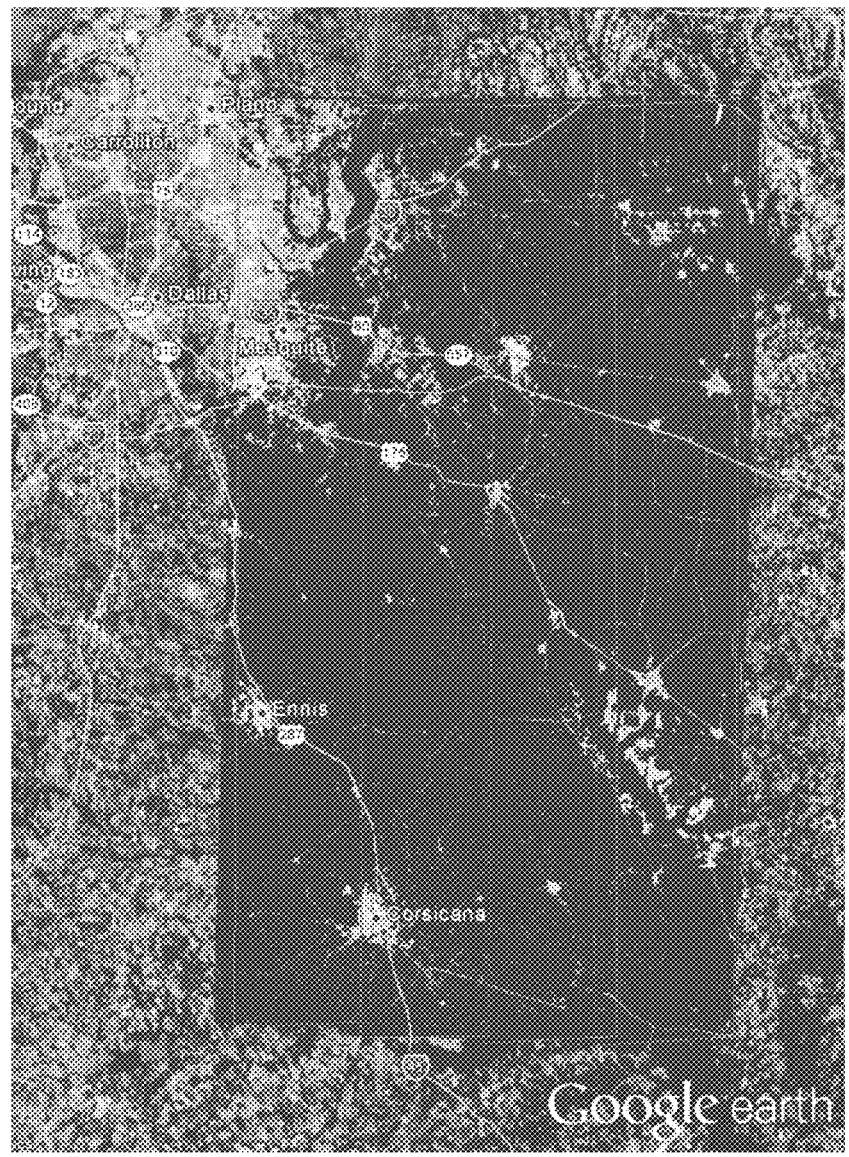
FIG. 6 illustrates overlapping portions of a National Land Cover Database 2006 information layer and a plurality of multispectral images acquired by the WorldView 2 satellite over a portion of Texas near Dallas, Tex.

The method 500 may begin by decomposing 504 one or more HR/VHR input satellite images of a particular geographic area into a plurality of connected components (e.g., groups of pixels that collectively define the input images as whole) of a first hierarchical data structure. With reference to FIGS. 2 and 3, for instance, the construction engine 232 of the automated extraction system 200 may receive one or more input satellite images 304 (e.g., HR/VHR satellite image data 224) of a particular geographic area (e.g., WorldView 2 multispectral images acquired over a portion of Texas near Dallas, Tex. as shown in FIG. 6) and break the input images 304 down into a plurality of components 308. The construction engine 232 then appropriately organizes or arranges the various components 308 of the input images 304 into a first hierarchical data structure 248 such as a Max-Tree 300 made up of a plurality of hierarchically interconnected nodes 312, where each node 312 includes one or more of the components. Part of organizing the components 308 into the Max-Tree 300 also includes appropriately determining or otherwise obtaining feature elements 314 (e.g., k-dimensional descriptors) for each component 308 such as contrast, area, compactness, linearity, average spectral response, eccentricity and/or inertia for the component. The various feature elements 314 of each component 308 may be appropriately organized into a feature element or attribute vector for the component 308.

In the case of a multi-spectral image, for instance, the various spectral bands may be fused into a single band in any appropriate manner before the image is decomposed into the first hierarchical data structure. For example, the spectral bands of an 8-band multi-spectral image may be fused into a single band by way of the following built-up (BU) index which may be computed for each pixel of the input image:

$$BU = \frac{RE - NIR2}{RE + NIR2}$$

where "RE" is the intensity of electromagnetic radiation received in the red edge band of the electromagnetic spectrum, and "NIR2" is the intensity of electromagnetic radiation received in the NIR2 band of the electromagnetic spectrum. In this regard, the pixels of the 8-band multispectral image may be broken and arranged into a plurality of hierarchical components based on the respective BU values of the pixels.

As another example, the spectral bands of a 4-band multi-spectral image may be fused into a single image by way of the following built-up (BU) index which may be computed for each pixel of the input image:

$$BU = \frac{R - NIR}{R + NIR}$$

where "R" is the intensity of electromagnetic radiation received in the red band of the electromagnetic spectrum, and "NIR" is the intensity of electromagnetic radiation received in the NIR band of the electromagnetic spectrum. In this regard, the pixels of the 4-band multispectral image may be broken and arranged into a plurality of hierarchical components based on the respective BU values of the pixels.

In one arrangement, the Max-Tree 300 may be a rooted, uni-directed tree with its leaves (e.g., leaves 316, 320, 324) corresponding to a regional maxima of the input images 304 and its root (e.g., node 328) corresponding to a single connected component defining the background of the input images 304. For instance, the hierarchical ordering of the nodes 312 may encode the nesting of peak components (e.g., pixels with intensities greater than a level "h") with respect to the gray-scale range of the input images 304. The image may be thresholded at each grey level to provide as many binary images as the number of grey levels. Each binary image may then be analyzed to derive its connected components. Each node 312 may generally point to its parent (i.e., the first ancestor node 312 below the given level) while the root node 328 points to itself. In one embodiment, each node 312 may include a pointer to a data structure that stores auxiliary data for each node 312. The construction engine 232 may compute or otherwise determine the feature elements 314 from such auxiliary data. The Max-Tree 300 may thus allow for compact storage of the connected components from all grey levels while having a limited computational complexity. In any case, the first hierarchical data structure(s) 248 (e.g., Max-Tree 300) may be appropriately stored in memory 204 for quick retrieval during subsequent steps of the method 500.

As shown in FIG. 5, the method 500 may then include constructing 508 a second hierarchical data structure that includes a plurality of hierarchically-arranged nodes, where each of the feature elements 314 depends from one of the nodes. With reference to FIGS. 2 and 3, the construction engine 232 may obtain the various feature elements 314 of the nodes 312 (e.g., of the components 308), where each feature element lies in a two-dimensional (e.g., x, y) space, and construct a second hierarchical data structure 252 such as a KD-Tree. Constructed second hierarchical data structure(s) 252 may be appropriately stored in memory 204 for quick retrieval during subsequent steps of the method 500.

FIG. 4a illustrates a simplified KD-Tree-based space partitioning procedure 400 that may be used to build a (hierarchically-arranged) KD-Tree. In one arrangement, the feature elements 314 may be initially disposed at appropriate locations with respect to an x, y coordinate system as shown in a first step 404 of the procedure 400. As just one example, the x-axis may correspond to the area of each component (e.g., a ground area collectively represented by the image pixels making of the component) and the y-axis may correspond to the red color response of each component. The construction engine 232 may then create a root node $f_1$ as shown in a second step 408 by splitting the feature elements 314 into two groups with a vertical line through the median x-coordinate of the feature elements 314. A similar procedure may then be performed to create child nodes $f_2$, $f_3$, as shown in a third step 412, only with respective horizontal lines through the respective median y-coordinates of the feature elements 314 on either side of the root node $f_1$.

The splitting may then continue recursively to create leaf nodes $f_4$, $f_5$, $f_6$, $f_7$ as shown in a fourth step 416, where each leaf node $f_4$, $f_5$, $f_6$, $f_7$ contains a single feature element 314 or up to a maximum of "m" feature elements 314, where m may be appropriately designated in advance. FIG. 4b illustrates a simplified KD-Tree built from the nodes $f_1$-$f_7$ and feature elements 314 illustrated in the fourth step 416 of FIG. 4a. As shown, each of the feature elements 314 depends from at least one of the nodes. While a two-dimension space partitioning structure is illustrated in each of the steps of FIG. 4a, it is to be understood that more complicated space partitioning structures may be constructed to accommodate more than two dimensions of feature elements. For instance, all of the feature elements 314 may be fused together in the partitioning structure and then splitting may occur against the most varying dimension. The feature elements 314 may then be clustered with respect to their full description which is the concatenation of the shape descriptors plus the spectral averages.

Returning to FIG. 5, the method 500 may include categorizing 512 at least some components of the first hierarchical data structure as either structures of interest (e.g., built-up) or non-structures of interest (e.g., non-built-up) using LR satellite image data. With reference to FIG. 2, the training engine 236 of the automated extraction system 200 may receive one or more reference satellite image data sets (e.g., LR satellite image data 228) over a geographic area that overlaps the geographic area over which the one or more input satellite images 304 were obtained (e.g., Lebanon). For instance, FIG. 6 illustrates a graphical representation of an NLCD 2006 information layer over a portion of Texas near Dallas, Tex. (e.g., where more highly populated areas (e.g., around Mesquite, Ennis and Corsicana, Tex.) are represented by different colors than less populated areas (e.g., along highway 287 between Ennis and Corsicana, Tex.).

In one arrangement, the training engine 236 may derive training components from the plurality of components 308 of the first hierarchical data structure 248/300 to be subsequently used to train the second hierarchical data structure 252/450 as will be described below. As just one example, the training engine 236 may consider a particular component 308 (e.g., group of pixels of the one or more input satellite images 304) of the first hierarchical data structure 248/300 as being a "positive" example in the event that the particular component 308 falls mostly or completely within an urban area as indicated in a corresponding portion of the one or more reference satellite image data sets (e.g., the NLCD 2006 information layer of FIG. 6). In contrast, the training engine 236 may consider a particular component 308 of the first hierarchical data structure 248/300 as being a "negative" example in the event that a corresponding portion of the one or more reference satellite image data sets is mostly or completely devoid of urban areas. In one embodiment, components 308 of the first hierarchical data structure 248/300 may be appropriately weighted to indicate the relative degree to which corresponding portions of the one or more reference satellite image data sets do or do not indicate urban or built-up areas.

In any event, and once a group of training components has been obtained (e.g., a subset of the plurality of components 308 of the first hierarchical data structure 248/300, such as one or more small, limited, and/or random portions of FIG. 6 so as to limit computational costs), the method 500 includes training 516 the second hierarchical data structure 252/450 with the particular feature elements 314 of the trained or categorized components obtained in step 512 to obtained a trained second hierarchical data structure 256 (see FIG. 2). With reference to FIG. 3, assume for purposes of discussion that component(s) 308 of leaf node 320 was/were identified as positive (e.g., built-up) examples in the categorizing step 512. In this regard, the training engine 236 may obtain the particular feature element(s) 314 (e.g., particular contrast level, compactness, average spectral response, etc.) associated with the component(s) 308 of the leaf node 320 (e.g., as well as feature element(s) 314 of parent, grandparent, root nodes, etc. along a common leaf-path), identify any same or similar feature elements 314 in the second hierarchical data structure 252/450, and label (e.g., tag, flag, mark, note, etc.) the nodes along the respective leaf-paths of the identified feature elements 314 in the second hierarchical data structure 252/450 as being positive (e.g., built-up) feature elements and/or negative (e.g., non-built-up) feature elements in any appropriate manner.

For instance, each of the nodes $f_1$-$f_7$ of the second hierarchical data structure 252/450 may include respective positive and/or negative class counters 478 configured to convey whether or not (or a degree to which) the nodes $f_1$-$f_7$ are within the positive or negative class. In this regard, the training engine 236 may update (e.g., increment, add to, etc.) the positive class counters 478 of all nodes $f_1$-$f_7$ along the leaf-path (e.g., branch) within which is located one or more feature elements 314 that are the same as or similar to those of the training components 308. In contrast, the positive class counters 478 of those of the nodes $f_1$-$f_7$ not resident within leaf-paths of one or more feature elements 314 that are the same as or similar to those of the training components 308 may be left untouched, the positive class counters 478 may be appropriately updated (e.g., reduced), the negative class counters 478 may be updated (e.g., incremented, added to), and/or the like. A similar procedure may be performed for each feature element 314 of each of the training components 308.

In one arrangement, two or more of the feature elements 314 of the second hierarchical data structure 252/450 that are close enough with respect to some dissimilarity (e.g., that are in the same neighborhood or cluster) may be assigned the same class label (e.g., and the class counters 478 of the nodes of respective leaf-paths appropriately updated). Stated differently, the class label of a single feature element 314 can be propagated to all other elements in the cluster (e.g., and their respective nodes) at little to no further computational cost thus reducing the overall computational overhead.

With reference to FIG. 4b, for instance, assume that feature element(s) 454, 458 are disposed within a first cluster 462 while feature element(s) 466, 470 are disposed with a second cluster 474. Furthermore, assume the training engine 236 initially labeled feature element(s) 454 as being in the "positive" class due to a similarity to feature element(s) 314 of the training components 308 but did not initially label any of feature elements 458, 466, 470 as being in the positive class. In this regard, the training engine 236 may also label the feature element(s) 458 as being in the positive class due to the feature elements 454, 458 being within the first cluster 462. In one variation, the more feature elements 314 of a particular cluster that are initially labeled as being within the positive class, the greater degree to which feature elements 314 in the cluster that are not initially labeled as being within the positive class are subsequently labeled as being within the positive class. However, the training engine 236 may not label the feature element(s) 466, 470 as being in the positive class as the feature element(s) 466, 470 are not within the first cluster 462. Of course, the feature elements 314 of other training components 308 may still cause the feature element(s) 466, 470 to be labeled in the positive class.

Again with reference back to FIG. 5, the method 500 may include classifying 520 components of the first hierarchical data structure 248/300 as structures of interest (e.g., built-up) or non-structures of interest (e.g., non-built-up) with the trained second hierarchical data structure 256. For instance, the classification engine 240 of the automated extraction system 200 (see FIG. 2) may identify those of the nodes $f_1$-$f_7$ of the trained second hierarchical data structure 256 whose class counters 478 indicate the node as being within the positive class (e.g., as being associated with structures of interest, such as built-up). In one arrangement, any appropriate thresholds or the like may be employed to allow the classification engine 240 to quickly identity those of the nodes $f_1$-$f_7$ in the positive class (e.g., class counters above or below one or more particular thresholds). In any case, the classification engine 240 may then identify the feature elements 314 depending from the leaves of each of the positively identified nodes $f_1$-$f_7$ and use the identified feature elements 314 to classify components 304 of the first hierarchical data structure 300 as being structures of interest (e.g., positive class, built-up) or non-structures of interest (e.g., negative class, non-built-up).

With reference to FIG. 3, for instance, assume that feature element(s) 332 of node 324 of the first hierarchical data structure 300 is or are the same or similar to a feature element 314 from the second hierarchical data structure 450 that depends from a leaf node of a positively identified node. In this regard, the classification engine 240 may classify component 336 of node 324 as being or identifying a structure of interest (e.g., an urban area). A similar process may be performed for other feature elements 314 associated with positively identified nodes from the second hierarchical data structure 450. Furthermore, other nodes 312 disposed along the same path or branch as the initially classified node 324 may also be classified as being structures of interest. While not discussed in more detail, a similar process may be performed to classify certain components 308 as being non-structures of interest.

It is to be understood that this discussion has been greatly simplified and has merely been provided to assist the reader in understanding the functionalities disclosed herein. Furthermore, numerous variations and more complicated arrangements are envisioned. For instance, one arrangement envisions that more than a particular threshold number of feature elements 314 of a particular node 312 of the first hierarchical data structure 300 must be labeled as structures of interest (e.g., two or more, three or more, etc.) before the corresponding component(s) 336 of the node 312 can be classified as being a structure of interest. In another arrangement, certain of the nodes 312 and/or components 308 may be appropriately clustered, grouped or the like (e.g., as discussed in relation to the second hierarchical data structure 252/450). In this regard, classification of one component 308 in a certain regard may result in similar classification of other clustered components 308.

In one variation, the categorizing 512 may be recursively performed with respect to additional portions of the plurality of components 308 of the first hierarchical data structure 248/300 to further refine the accuracy of the training 516 and classifying 520. For instance, a second subset of the components 308 of the first hierarchical data structure 248/300 (e.g., corresponding to one or more different, partially or fully non-overlapping portions of Texas in FIG. 6) may be categorized as structures of interest or non-structures of interest using corresponding portions of the reference satellite image data set (e.g., the NLCD 2006 of FIG. 6) to derive additional "training components" from the first hierarchical data structure 248/300. Thereafter, the second hierarchical data structure 252/450 may be trained 516 as discussed previously with the feature elements 314 of the second subset (e.g., with the additional training components) and then (all) of the components 308 of the first hierarchical data structure 248/300 may be classified/reclassified as being structures of interest or non-structures of interest.

As shown in FIG. 5, the method 500 may then include extracting 524 (e.g., isolating, obtaining, etc.) components (e.g., see extracted components 260 in FIG. 2) that are classified as identifying structures of interest from the classifying step 520 and querying 528, for each respective extracted component 308, whether an error rate (e.g., EERs) between the extracted component and a corresponding portion of a reference satellite image data set (e.g., LR satellite image data associated with the subject geographic area and having a spatial resolution lower than that of the input satellite images 304) is less than a particular threshold error rate. The reference satellite image data set used to determine the error rates may be the same as or different than the reference satellite image data set used in the categorizing step 512. Those extracted components 308 associated with error rates below the threshold error rate may be mapped 532 (e.g., via mapping engine 244) into a resultant image (e.g., resultant image 264) that includes the structures of interest (e.g., at a spatial resolution greater than that of the reference satellite image data set(s), such as at least substantially the same as that of the input image(s) 304). For instance, see FIGS. 7a and 8a which present a result of the mapping step 532 over a portion of Texas at respective first and second levels of zoom. Resultant images 264 may be appropriately stored in both (volatile) memory 204 and (non-volatile) storage 212.

As an example, cloud cover or the like when the input satellite image(s) 304 was/were obtained may result in error rates above the threshold for extracted components classified as identifying built-up structures. In this regard, such extracted components may be not mapped into the resultant image or at least mapped into the resultant image to a lesser degree (e.g., assigned a lower weight based how far over the threshold were the corresponding error rates). However, the decomposing 504, constructing 508, categorizing 512, training 516, classifying 520, extracting 524, querying 528 and mapping 532 may be performed with respect to subsequent input satellite images (e.g., second, third, etc.) over the substantially same geographic area that are obtained via heterogeneous sources, different satellites, different locations, different times such as multi-temporal images, different frequencies or wavelengths such as multispectral images, and/or the like. Incorporation of additional input satellite images into the method 500 may increase the likelihood that those portions of the resultant image that would otherwise be depicting built-up (but for the corresponding previously extracted components not being mapped into the resultant image due to error rates over the threshold) do eventually depict corresponding built-up portions (e.g., due to the subsequent/additional input satellite images being obtained from a high azimuth, during a partially or fully cloudless, sunny day, etc.) to allow for an iterative refinement of the resultant image (e.g., the images presented in FIGS. 7a and 8a) over a plurality of cycles. While the method 500 has been discussed as including the querying step 528, some arrangements envision proceeding from the extracting step 524 directly to the mapping step 532 without performing the querying step 528 (e.g., to reduce computational costs, such as time, resources, etc.).

Figures 8A, 8B:

Non-Limiting Example:

Four WorldView-2 8-band multispectral images acquired over a portion of Texas near Dallas, Tex. as shown in FIG. 6 are considered. Max and KD-Trees (e.g., first and second hierarchical data structures) are obtained as discussed previously with respect to steps 504 and 508 of FIG. 5. Samples from the globally-consistent NLCD 2006 information layer shown in FIG. 6 are systematically collected (where the data was collected from orbiting Landsat satellites at a spatial resolution of 30 meters). In the case of the multispectral scenes of FIG. 6 containing 10070×58734 pixels, components can arranged into a Max-Tree (e.g., as in FIG. 3) and then a corresponding KD-Tree (e.g., as in FIG. 4b) can be generated in about 387 s. Subsequently, training components are derived considering the NLCD 2006 information layer (e.g., step 512 of FIG. 5) in about 23 s before being used for training the KD-Tree in under is (step 516 of FIG. 5). The classification (e.g., step 520 of FIG. 5) is then obtained in well under is (e.g., much closer to 0s than to 1s) before components identifying built-up are extracted and reprojected in (e.g., mapped into at step 532 of FIG. 5) the image space. The result of this process on the WorldView-2 multispectral scenes is displayed in FIGS. 7a and 8a. FIGS. 7b and 8b respectively illustrate close-up portions of the NLCD 2006 and WV2 multispectral images corresponding to the resultant images of FIGS. 7a and 8a.

At low spatial resolutions (e.g., satellite image data obtained from Landsat 30m sensor, MODIS 500m sensor, etc.), spectral measurements can calibrated such that they are not affected by the sun, satellite angles, atmospheric conditions, and the like. In this regard, LR satellite image data can be used to accurately classify structures of interest in HR/VHR satellite image data as disclosed herein. In one arrangement, the utilities disclosed herein may be used to generate a globally-consistent HR/VHR satellite image layer that includes structures of interest (e.g., built-up) and that is devoid of non-structures of interest. The globally-consistent layer can be used in numerous contexts such as in assessing population densities, qualities of life, vulnerability factors, disaster risks, sufficiency of civil infrastructures, economic growth, poverty levels, event monitoring and evolution, and the like.

It will be readily appreciated that many deviations and/or additions may be made from or to the specific embodiments disclosed in the specification without departing from the spirit and scope of the invention. In one arrangement, it is envisioned that different structures of interest (e.g., different types of built-up) may be differently shaded, colored, and/or the like (e.g., such as based on one or more geometric and/or radiometric attributes of pixels or components of the resulting image) in the resulting image to allow analysts to be able to quickly analyze the resulting image. As an example, the mapping engine 264 may analyze the feature elements 314 of the extracted input image components to determine a type of built-up structure represented by the particular component(s). For instance, buildings may exhibit one general type of feature element "signature" while tents may exhibit another type of feature element signature. The mapping engine 264 may have access to a database that correlates feature element signatures with respective colors, shades, and/or the like. During the mapping of the extracted components into the resulting image, the mapping engine 264 may access the database and implement the colors, shades, etc. as appropriate.

In another arrangement, it is envisioned that manual (e.g., analyst) input may replace or at least supplement categorizing step 512 of FIG. 5. For instance, it is envisioned that a user may be able to manually select (e.g., on a display with any appropriate user manipulable device) one or more positive training regions (e.g., representing structures of interest) of the input satellite image and/or one or more negative training regions (e.g., not representing structures of interest) of the input satellite image. The feature elements of the components of the first hierarchical data structure representing the selected regions may then be used to train 516 the second hierarchical data structure before components are appropriately classified in step 520. For example, the user may continue to select different training regions/examples after each classification step 520. In one variation, it is envisioned that a user may manually selected at least some positive and negative training regions/components and then a reference data set (e.g., NLCD 2006) may be used to identify other training regions/components.

In a further arrangement, a plurality (e.g., a "forest") of second hierarchical data structures (e.g., KD-Trees) may be constructed and trained for use in classifying and thus extracting different types of structures of interest from input satellite images. As one example, a first KD-Tree may be generated with a first set of feature elements of the first hierarchical data structure and a second KD-Tree may be generated with a second set of feature elements of the first hierarchical data structure that is at least partially non-overlapping with the first set of feature elements (e.g., the first set includes contrast, compactness and linearity values of each of the components of the first hierarchical data structure and the second set includes compactness, linearity and average spectral response of each of the components of the first hierarchical data structure). Thereafter, training components may be selected in any appropriate manner from the first hierarchical data structure (e.g., with one or more low resolution information layers as discussed herein, via manual input, and/or the like) and their respective feature elements used to train each of the first and second KD-Trees to be able to detect particular types of structures (e.g., particular types of built-up) in at least one input satellite image. The first and second (e.g., and/or additional) KD-Trees may then be used to classify particular objects/areas/regions of the at least one input satellite image which may then be extracted and incorporated into a resultant image.

As another example, it is envisioned that a single second hierarchical data structure (e.g., a single KD-Tree) that includes all of the feature elements from the first hierarchical data structure may be initially constructed as disclosed herein (e.g., via fusing all of the feature elements together in the partitioning structure and then performing the splitting against the most varying dimension). Thereafter, however, a plurality of copies of the KD-Tree may be made to create a "forest" of KD-Trees, where each copy may be trained to detect different objects/areas/etc. in the at least one input satellite image. For instance, one or more training components representing positive and/or negative examples of a first type of object/structure/area of the first hierarchical data structure may be selected from the first hierarchical data structure in any appropriate manner (e.g., with one or more low resolution information layers as discussed herein, via manual input, and/or the like) and their feature elements used to train a first of the KD-Tree copies to detect the first type of object/structure/area. Additionally, one or more different training components representing positive and/or negative examples of a additional types of objects/structures/areas of the first hierarchical data structure may be selected from the first hierarchical data structure in any appropriate manner (e.g., with one or more low resolution information layers as discussed herein, via manual input, and/or the like) and their feature elements used to train additional ones of the KD-Tree copies to detect the additional types of objects/structures/areas. In one variation, different low resolution information layers may be used to identify different types of training components from the first hierarchical data structure. The various differently-trained KD-Trees may then be used to classify particular objects/areas/regions of the at least one input satellite image which may then be extracted and incorporated into one or more resultant images.

Furthermore, while the first hierarchical data structure has been discussed primarily in form of a Max-Tree, is it envisioned that other forms of the first hierarchical data structure may be used with the utilities disclosed herein. In one arrangement, the first hierarchical data structure may be in the form of an "Alpha-Tree" whereby pixels of the input satellite image (e.g., intensity values, radiance values, BU values, etc.) may be hierarchically grouped into components (e.g. nodes) based on any appropriate measure of dissimilarity between adjacent nodes. Thereafter, the second hierarchical data structure may be constructed from feature elements (e.g., attribute vectors) of the components/nodes of the Alpha-Tree, training components/nodes of the Alpha-Tree may be selected, the second hierarchical data structure may be trained, the components/nodes of the Alpha-Tree may be classified, and structures of interest may be extracted from the input image and displayed in a resultant image as disclosed herein.

Embodiments disclosed herein can be implemented as one or more computer program products, i.e., one or more modules of computer program instructions encoded on a computer-readable medium for execution by, or to control the operation of, data processing apparatus. For example, the logic or software of the construction engine 232, training engine 236, classification engine 240 and mapping engine 244 responsible for the various functionalities disclosed herein may be provided in such computer-readable medium of the automated extraction system 200 and executed by the processor 208 as appropriate. The computer-readable medium can be a machine-readable storage device, a machine-readable storage substrate, a non-volatile memory device, a composition of matter affecting a machine-readable propagated signal, or a combination of one or more of them. In this regard, the system 200 may encompass one or more apparatuses, devices, and machines for processing data, including by way of example a programmable processor, a computer, or multiple processors or computers. In addition to hardware, the system 200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., construction of the first and second hierarchical data structures and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed is:

1. A method of extracting built-up structures from satellite imagery data, comprising:
    organizing, using a processor, pixels of an input satellite image into a plurality of components of a first hierarchical data structure, wherein the input image is associated with a geographic area, and wherein each of the components is characterized by a vector of feature elements;
    constructing, using the processor, a second hierarchical data structure that includes a plurality of hierarchically-arranged nodes, wherein each of the feature elements depends from at least one of the plurality of nodes, and wherein the constructing includes:
        disposing the feature elements of the vectors of the components of the first hierarchical data structure into a feature space; and
        recursively partitioning the feature elements in the feature space to create the plurality of hierarchically-arranged nodes of the second hierarchical data structure;
    deriving training components from the plurality of components of the first hierarchical data structure that indicate built-up and non-built-up structures in the input image using a first reference image data set that is associated with the geographic area;
    training, with the processor, the second hierarchical data structure with the vector of feature elements of each of the training components for detecting built-up structures;
    classifying, with the processor and using the trained second hierarchical data structure, the plurality of components of the first hierarchical data structure as identifying built-up structures or non-built-up structures; and
    mapping components of the plurality of components that identify built-up structures as classified during the classifying step into a resultant image that is associated with the geographic area.

2. The method of claim 1, further comprising:
    deriving additional training components from the plurality of components of the first hierarchical data structure that indicate built-up and non-built-up structures in the input image using the first reference image data set;
    training, with the processor, the second hierarchical data structure with the vector of feature elements of each of the additional training components for detecting built-up structures; and
    classifying, with the processor and using the second hierarchical data structure as trained with the additional training components, the plurality of components of the first hierarchical data structure as identifying built-up structures or not identifying built-up structures.

3. The method of claim 1, further comprising:
    ascertaining error rates between components that identify built-up structures from the classifying step and corresponding portions of a second reference image data set that identify built-up structures; and
    mapping components that identify built-up structures that are associated with error rates below a threshold error rate into the resultant image that is associated with the geographic area.

4. The method of claim 3, wherein the first and second reference data sets are different.

5. The method of claim 3, wherein the first and second reference data sets are the same.

6. The method of claim 3, wherein the input image comprises a first input image, wherein the method further comprises:
    organizing, using the processor, pixels of a second input image into a plurality of components of a first hierarchical data structure, wherein the second input image is associated with the geographic area, wherein each of the components is characterized by a vector of feature elements, and wherein the first and second input images are at least one of multi-temporal or captured from different locations;
    constructing, using the processor, a second hierarchical data structure that includes a plurality of hierarchically-arranged nodes, wherein each of the feature elements of the second input image depends from at least one of the plurality of nodes; and
    deriving training components from the plurality of components of the first hierarchical data structure that indicate built-up and non-built-up structures in the second input image using the first reference image data set;
    training, with the processor, the second hierarchical data structure with the vector of feature elements of each of the training components of the second input image for detecting built-up structures;

classifying, with the processor and using the second hierarchical data structure as trained with the training components of the second input image, the plurality of components of the second input image of the first hierarchical data structure as identifying built-up structures or non-built-up structures;

ascertaining error rates between components of the second input image that identify built-up structures from the classifying step and corresponding portions of the second reference data set that identify built-up structures; and mapping components that identify built-up structures in the second input image that are associated with error rates below a threshold error rate into the resultant image, wherein the resultant image comprises components from the first and second input images.

7. The method of claim 6, further comprising:
continuing to perform the organizing, constructing, deriving, training, classifying, ascertaining, and mapping steps with respect to additional input images that are at least one of multi-temporal relative to the first and second input images or captured from locations different than those from which the first and second input images were captured.

8. The method of claim 1, wherein one of the training components identifies built-up structures when the training component falls within a built-up area as indicated by the first reference data set.

9. The method of claim 1, wherein the plurality of feature elements comprises at least two of contrast, area, compactness, linearity, average spectral response, eccentricity or inertia of a respective one of the plurality of components.

10. A method of extracting built-up structures from satellite imagery data, comprising:
organizing, using a processor, an input satellite image into a plurality of components of a first hierarchical data structure, wherein the input image is associated with a geographic area and has a first resolution, and wherein each of the components is characterized by a plurality of feature elements;

constructing, using the processor, a second hierarchical data structure that includes a plurality of hierarchically-arranged nodes, wherein each of the feature elements depends from at least one of the plurality of nodes, and wherein the constructing includes:
disposing the feature elements of the vectors of the components of the first hierarchical data structure into a feature space; and
recursively partitioning the feature elements in the feature space to create the plurality of hierarchically-arranged nodes of the second hierarchical data structure; and deriving training components from the plurality of components of the first hierarchical data structure that indicate built-up and non-built-up structures in the input image using a first reference image data set that is associated with the geographic area and has a second resolution lower than the first resolution.

11. The method of claim 10, further comprising:
training, with the processor, the second hierarchical data structure with the plurality of feature elements of each of the training components for detecting built-up structures; and classifying, with the processor and using the trained second hierarchical data structure, the plurality of components of the first hierarchical data structure as identifying built-up structures or non-built-up structures.

12. The method of claim 11, wherein the training step comprises:
updating class counters of nodes of the second hierarchical data structure in response to feature elements of the training components corresponding to built-up or non built-up structures, wherein each node of the second hierarchical data structure comprises a built-up structure counter and a non built-up structure counter, and wherein the updating steps comprises:
increasing the count of one of the built-up structure counter and the non built-up structure counter.

13. The method of any of claim 11, further comprising:
mapping components of the plurality of components that identify built-up structures as classified during the classifying step into a resultant image that is associated with the geographic area and that has a third resolution that is greater than the second resolution.

14. The method of claim 13, further comprising:
deriving additional training components from the plurality of components of the first hierarchical data structure that indicate built-up and non-built-up structures in the input image using the first reference image data set, wherein the training components are non-overlapping with the additional training components;

training, with the processor, the second hierarchical data structure with the plurality of feature elements of each of the additional training components for detecting built-up structures; and classifying, with the processor and using the second hierarchical data structure as trained with the additional training components, the plurality of components of the first hierarchical data structure as identifying built-up structures or not identifying built-up structures.

15. The method of claim 11, further comprising:
ascertaining error rates between components that identify built-up structures from the classifying step and corresponding portions of a second reference image data set that identify built-up structures; and mapping components that identify built-up structures that are associated with error rates below a threshold error rate into a resultant image that is associated with the geographic areas and that has a third resolution that is greater than the second resolution.

16. The method of claim 15, wherein the second reference image set is associated with the geographic area and has a fourth resolution lower than the first resolution.

17. A system for extracting structures of interest from optical images, comprising:
a construction engine, executable by a processor, that organizes the pixels of an input image associated with a geographic area and having a first resolution into a plurality of components, generates a first hierarchical data structure from the plurality of components that includes a plurality of k-dimensional feature elements of each of the components, and creates a second hierarchical data structure that includes a plurality of hierarchically-arranged nodes, wherein each of the feature elements depends from at least one of the plurality of nodes, and wherein the construction engine creates the second hierarchical data structure by disposing the feature elements of the vectors of the components of the first hierarchical data structure into a feature space and recursively partitioning the feature elements in the feature space to create the plurality of hierarchically-arranged nodes of the second hierarchical data structure; and a training engine that uses feature elements of a first portion of the plurality of components of the first hierarchical data structure to train the second hierarchical data structure to detect components of the plurality of components in the first hierarchical data structure that correspond to structures of interest in the input image.

18. The system of claim 17, further comprising:
a classification engine, executable by the processor, that uses the trained second hierarchical data structure to extract a second portion of the plurality of components of the first hierarchical data structure that corresponds to the structures of interest in the input image, wherein the second portion encompasses the first portion.

19. The system of claim 18, further comprising:
a mapping engine that maps the second portion into a resultant image associated with the geographic area.

20. The system of claim 17, wherein the training engine utilizes a portion of a reference information layer associated with the geographic area to identify the first portion, wherein the input image has a first resolution and the reference image has a second resolution lower than the first resolution, and wherein the system further comprises:
a mapping engine that maps the second portion into a resultant image that is associated with the geographic area and that has a third resolution that is greater than the second resolution.

* * * * *